(12) United States Patent
Kido

(10) Patent No.: US 8,102,438 B2
(45) Date of Patent: Jan. 24, 2012

(54) IMAGING DEVICE

(75) Inventor: Kenichi Kido, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 146 days.

(21) Appl. No.: 12/766,215

(22) Filed: Apr. 23, 2010

(65) Prior Publication Data
US 2010/0201857 A1  Aug. 12, 2010

Related U.S. Application Data

(62) Division of application No. 11/523,083, filed on Sep. 19, 2006, now Pat. No. 7,733,384.

(30) Foreign Application Priority Data

Sep. 20, 2005 (JP) ................................. 2005-271777
Sep. 14, 2006 (JP) ................................. 2006-248946

(51) Int. Cl.
*H04N 5/235* (2006.01)
*H04N 5/335* (2011.01)
*H04N 5/238* (2006.01)
*H04N 5/225* (2006.01)

(52) U.S. Cl. .................. 348/229.1; 348/221.1; 348/314; 348/364; 348/372

(58) Field of Classification Search ............... 348/229.1, 348/221.1, 314, 364, 372
See application file for complete search history.

(56) References Cited

U.S. PATENT DOCUMENTS

| 5,777,670 A | 7/1998 | Sawanobori et al. |
| 5,917,546 A | 6/1999 | Fukui |
| 6,628,328 B1 | 9/2003 | Yokouchi et al. |
| 6,816,199 B1 | 11/2004 | Ide |
| 7,298,408 B2 | 11/2007 | Yoshida |
| 7,474,344 B2 | 1/2009 | Fukui |
| 2002/0126214 A1 | 9/2002 | Kijima et al. |
| 2003/0086005 A1 | 5/2003 | Nakamura |
| 2003/0234873 A1 | 12/2003 | Ishida et al. |
| 2004/0061802 A1 | 4/2004 | Yoshida |

(Continued)

FOREIGN PATENT DOCUMENTS

JP   6-141243 A   5/1994

(Continued)

OTHER PUBLICATIONS

Japanese Office Action, mailing date of Nov. 4, 2009, issued in corresponding Japanese Patent Application No. 2006-248946.

(Continued)

*Primary Examiner* — David Ometz
*Assistant Examiner* — Quang Le
(74) *Attorney, Agent, or Firm* — Westerman, Hattori, Daniels & Adrian, LLP

(57) ABSTRACT

An imaging device of the present invention includes a solid-state image sensing device; a vertical transfer drive circuit for feeding a subpulse to the solid-state image sensing device; and a control circuit, and repeats a series of photographing operations in a cycle same as or longer than a period during which the series of photographing operations are performed, the series of photographing operations including an exposure operation for exposing an imaging area after the subpulse is fed to the solid-state image sensing device to sweep out electric charges accumulated in pixels. The control circuit stops the subpulse from being fed from the vertical transfer drive circuit to the solid-state image sensing device during a period during which the exposure operation included in the series of photographing operations is not performed.

5 Claims, 9 Drawing Sheets

U.S. PATENT DOCUMENTS

2005/0083419 A1    4/2005  Honda et al.

FOREIGN PATENT DOCUMENTS

| | | |
|---|---|---|
| JP | 6-141248 A | 5/1994 |
| JP | 7-245730 A | 9/1995 |
| JP | 10-136271 A | 5/1998 |
| JP | 11-112882 A | 4/1999 |
| JP | 2000-338393 A | 12/2000 |
| JP | 2001-268452 A | 9/2001 |
| JP | 2002-152602 A | 5/2002 |
| JP | 2003-46860 A | 2/2003 |
| JP | 2003-189183 A | 7/2003 |
| JP | 2004-72658 A | 3/2004 |
| JP | 2004-320180 A | 11/2004 |
| JP | 2005-130045 A | 5/2005 |

OTHER PUBLICATIONS

Japanese Office Action issued Feb. 22, 2010, issued in corresponding Japanese Patent Application No. 2006-248946.

IMAGING DEVICE

CROSS REFERENCE TO RELATED APPLICATION

This application is a divisional application of U.S. application Ser. No. 11/523,083 filed Sep. 19, 2006 the entire contents of which are incorporated herein by reference.

FIELD OF THE INVENTION

The present invention relates to an imaging device such as a digital still camera including a solid-state image sensing device including a CCD or the like.

BACKGROUND OF THE INVENTION

Digital still cameras including a solid-state image sensing device including a CCD or the like have become popular in recent years. FIG. 2 shows a configuration of an interline transfer solid-state image sensing device 1 used for a digital still camera. The solid-state image sensing device 1 forms an imaging area including a plurality of pixels 11 by having color filter arrays on a plurality of photo sensors arranged in the form of a matrix, and has a plurality of vertical registers 12 for transferring electric charges of a plurality of arrays of vertically arranged pixels 11, and a horizontal register 13 for outputting the electric charges transferred by these vertical registers 12 every one horizontal period.

The above solid-state image sensing device 1 has an input terminal 8 for a first vertical transfer pulse $V\phi1$ having a first phase, an input terminal 7 for a second vertical transfer pulse $V\phi2$ having a second phase, input terminals 6, 5 for a pair of third vertical transfer pulses $V\phi3A$ and $V\phi3B$ having a third phase, an input terminal 4 for a fourth vertical transfer pulse $V\phi4$ having a fourth phase, input terminals 3, 2 for a pair of fifth vertical transfer pulses $V\phi5A$ and $V\phi5B$ having a fifth phase, and an input terminal 1 for a sixth vertical transfer pulse $V\phi6$ having a sixth phase. Feeding these vertical transfer pulses to the respective input terminals causes electric charges accumulated in the vertical registers 12 to be transferred to the horizontal register 13.

The solid-state image sensing device 1 also has input terminals 21, 16 for a pair of first horizontal transfer pulses $H\phi1A$ and $H\phi1B$, and input terminals 22, 17 for a pair of second horizontal transfer pulses $H\phi2A$ and $H\phi2B$ provided by inverting the first horizontal transfer pulses, respectively. Feeding these horizontal transfer pulses to the respective input terminals causes the electric charges transferred from the vertical registers 12 to the horizontal register 13 to be output outside.

The above solid-state image sensing device 1 is further provided with an input terminal 19 for a subpulse $\phi SUB$ for causing an electronic shutter operation for sweeping out electric charges accumulated in the pixels before exposure of the imaging area.

A conventional digital still camera can set a monitor mode for displaying images (through images) photographed by the solid-state image sensing device 1 on a monitor every 1/30 seconds. FIG. 8 shows operations of the conventional digital still camera at a time when a shutter button is depressed with the monitor mode being set, and the vertical transfer pulses $V\phi1$-$V\phi6$, horizontal transfer pulses $H\phi1A$, $H\phi1B$, $H\phi2A$, $H\phi2B$, and subpulse $\phi SUB$ to be fed to the solid-state image sensing device. SHT in FIG. 8 is a shutter pulse generated upon depression of the shutter button, and VD is a vertical synchronizing pulse. The vertical transfer pulses, horizontal transfer pulses and subpulse are a rectangular pulse. One block of the horizontal transfer pulses in FIG. 8 represents a series of horizontal transfer pulses.

As illustrated, the first vertical transfer pulse $V\phi1$, second vertical transfer pulse $V\phi2$, third vertical transfer pulses $V\phi3A$, $V\phi3B$, fourth vertical transfer pulse $V\phi4$, fifth vertical transfer pulses $V\phi5A$, $V\phi5B$ and sixth vertical transfer pulse $V\phi6$ are fed continuously, and a series of the first horizontal transfer pulses $H\phi1A$, $H\phi1B$, and second horizontal transfer pulses $H\phi2A$, $H\phi2B$ are fed intermittently to the solid-state image sensing device every one vertical period. This causes the electric charges accumulated in the pixels to be transferred as described later.

When the shutter button is depressed, in a first vertical period (#1V), a series of subpulses $\phi SUB$ are fed to the solid-state image sensing device to sweep out electric charges accumulated in the pixels, and thereafter the imaging area is exposed. Subsequently in a second vertical period (#2V), electric charges accumulated in the pixels due to the exposure in the first vertical period are transferred, and then, based on an image signal thereby obtained, a calculation for an exposure time and a focus adjustment value is started. In addition, a series of subpulses $\phi SUB$ are fed to the solid-state image sensing device to sweep out electric charges accumulated in the pixels, and thereafter the imaging area is exposed.

Next in a third vertical period (#3V), the calculation is continued, and thereafter the exposure time and focus adjustment value obtained by the calculation are set. In addition, electric charges accumulated in the pixels due to the exposure in the second vertical period are transferred, and then, based on an image signal thereby obtained, a calculation for an exposure time and a focus adjustment value is started. Further, a series of subpulses $\phi SUB$ are fed to the solid-state image sensing device to sweep out electric charges accumulated in the pixels, and thereafter the imaging area is exposed.

Subsequently in a fourth vertical period (#4V), the calculation is continued, and thereafter the exposure time and focus adjustment value obtained by the calculation are set. In addition, electric charges accumulated in the pixels due to the exposure in the third vertical period are transferred, and then, based on an image signal thereby obtained, a calculation for an exposure time and a focus adjustment value is started. Further, a series of subpulses $\phi SUB$ are fed to the solid-state image sensing device to sweep out electric charges accumulated in the pixels, and thereafter the imaging area is exposed. At this time, the exposure time and focus adjustment value set in the third vertical period will be reflected. Similarly, the following exposure, transfer, calculation and setting are concurrently performed during one vertical period.

When the shutter button is depressed, the above conventional digital still camera performs a series of photographing operations of an exposure, a transfer, calculation and setting over three vertical periods and every one vertical period as described above, and starts a photographing operation for image recording at a time point when an optimum exposure time and focus adjustment value are obtained.

The above conventional digital still camera has a calculation time exceeding one vertical period for obtaining photographing conditions such as an exposure time and a focus adjustment value. In contrast, FIG. 9 shows operations at a time when a shutter button is depressed of a conventional digital still camera with a calculation time less than one vertical period, and the vertical transfer pulses $V\phi1$-$V\phi6$, horizontal transfer pulses $H\phi1A$, $H\phi1B$, $H\phi2A$, $H\phi2B$, and subpulse $\phi SUB$ to be fed to the solid-state image sensing device. SHT in FIG. 9 is a shutter pulse generated upon depression of the shutter button, and VD is a vertical synchronizing pulse. The vertical transfer pulses, horizontal transfer pulses and subpulse are a rectangular pulse. One block of the horizontal transfer pulses in FIG. 9 represents a series of horizontal transfer pulses.

As illustrated, the first vertical transfer pulse V$\phi$1, second vertical transfer pulse V$\phi$2, third vertical transfer pulses V$\phi$3A, V$\phi$3B, fourth vertical transfer pulse V$\phi$4, fifth vertical transfer pulses V$\phi$5A, V$\phi$5B and sixth vertical transfer pulse V$\phi$6 are fed continuously to the vertical registers, and a series of the first horizontal transfer pulses H$\phi$1A, H$\phi$1B, and second horizontal transfer pulses H$\phi$2A, H$\phi$2B are fed intermittently to the solid-state image sensing device every one vertical period. This causes the electric charges accumulated in the pixels to be transferred as described later.

When the shutter button is depressed, in a first vertical period (#1V), a series of subpulses $\phi$SUB are fed to the solid-state image sensing device to sweep out electric charges accumulated in the pixels, and thereafter the imaging area is exposed. Next in a second vertical period (#2V), electric charges accumulated in the pixels due to the exposure in the first vertical period are transferred, and then, based on an image signal thereby obtained, a calculation for an exposure time and a focus adjustment value is performed. Then the exposure time and focus adjustment value obtained by the calculation are set. In addition, a series of subpulses $\phi$SUB are fed to the solid-state image sensing device to sweep out electric charges accumulated in the pixels, and thereafter the imaging area is exposed.

Subsequently in a third vertical period (#3V), electric charges accumulated in the pixels due to the exposure in the second vertical period are transferred, and then, based on an image signal thereby obtained, a calculation for an exposure time and a focus adjustment value is performed. Then the exposure time and focus adjustment value obtained by the calculation are set. In addition, a series of subpulses $\phi$SUB are fed to the solid-state image sensing device to sweep out electric charges accumulated in the pixels, and thereafter the imaging area is exposed. At this time, the exposure time and focus adjustment value set in the third vertical period will be reflected. Similarly, the following exposure, transfer, calculation and setting are concurrently performed during one vertical period.

When the shutter button is depressed, the above conventional digital still camera with a calculation time less than one vertical period performs a series of photographing operations of an exposure, a transfer, calculation and setting over two vertical periods and every one vertical period as described above, and starts a photographing operation for image recording at a time point when an optimum exposure time and focus adjustment value are obtained.

There has been proposed a solid-state image sensing device driving timing generator that subtracts an exposure time from a horizontal line number per one field to calculate a pulse number of a charge sweep signal XSUB, and outputs the charge sweep signal XSUB with the calculated pulse number (see JP 10-136271, A). There has been also proposed a solid-state image sensing device that sets the number of electronic shutter pulses $\phi$SUB when a frame read mode is set so that exposure times in respective fields are the same (see JP 2001-268452, A).

However, the conventional digital still cameras have been suffering from a problem of increased power consumption because a series of photographing operations are performed every one vertical period as shown in FIG. 8 and FIG. 9, so that the subpulse $\phi$SUB is fed to the solid-state image sensing device to perform an exposure operation, and the vertical transfer pulses V$\phi$1-V$\phi$6 and horizontal transfer pulses H$\phi$1A, H$\phi$1B, H$\phi$2A, H$\phi$2B are fed to the solid-state image sensing device to perform a transfer operation, throughout the whole period during which the series of photographing operations are repeated.

SUMMARY OF THE INVENTION

An object of the present invention is to provide an imaging device such as a digital still camera with less power consumption than that of conventional ones. Accordingly, the present inventor conducted an intensive study in order to solve the above problem, and, as a result, accomplished the present invention by finding that a series of photographing operations need not be repeated in a short cycle of one vertical period if images photographed by a solid-state image sensing device are not displayed on a monitor.

A first imaging device of the present invention includes a solid-state image sensing device including an imaging area including a plurality of pixels; a drive unit for driving the solid-state image sensing device; and a control unit for controlling an operation of the drive unit, the solid-state image sensing device being capable of sweeping out electric charges accumulated in the pixels in response to a subpulse fed from the drive unit, the drive unit including a pulse feeding circuit for feeding the subpulse to the solid-state image sensing device. The imaging device repeats a series of photographing operations in a cycle same as or longer than a period during which the series of photographing operations are performed, the series of photographing operations including an exposure operation for exposing the imaging area after the subpulse is fed to the solid-state image sensing device to sweep out the electric charges accumulated in the pixels, and the control unit includes a subpulse stop controller for stopping the subpulse from being fed from the drive unit to the solid-state image sensing device during a period during which the exposure operation included in the series of photographing operations is not performed.

The above first imaging device of the present invention repeats a series of photographing operations including an exposure operation in a cycle same as or longer than a period during which the series of photographing operations are performed. Therefore, an exposure operation included in the previous or next series of photographing operations is not performed within a period of the current series of photographing operations during which the exposure operation included therein is not performed, so that, during this period, the subpulse is stopped from being fed from the drive unit to the solid-state image sensing device. As a result, the subpulse is stopped from being fed during a period during which the exposure operation included in the series of photographing operations is not performed. This provides a smaller number of outputs of the subpulse than that of conventional digital still cameras where the subpulse is fed throughout the whole period during which the series of photographing operations are repeated, resulting in reduction in power consumption.

Instead of the subpulse stop controller, the control unit may include a subpulse reduction controller for reducing the number of subpulses to be fed from the drive unit to the solid-state image sensing device during a period during which no exposure operation is performed. In this way, the power consumption can be reduced by simply reducing the number of subpulses to be fed without completely stopping the subpulse from being fed.

Specifically, the solid-state image sensing device includes a plurality of vertical registers for vertically transferring electric charges in a plurality of arrays of vertically arranged pixels in response to a vertical transfer pulse fed from the drive unit; and a horizontal register for outputting the electric charges transferred by the plurality of vertical registers in response to a horizontal transfer pulse fed from the drive unit, the pulse feeding circuit of the drive unit being capable of feeding the vertical transfer pulse and horizontal transfer pulse to the solid-state image sensing device, the series of photographing operations including a transfer operation for feeding the vertical transfer pulse and horizontal transfer pulse to the solid-state image sensing device and transferring the electric charges in the plurality of arrays of vertically arranged pixels to the horizontal register for output to the outside from the horizontal register, the control unit including a transfer pulse stop controller for stopping the vertical transfer pulse and/or horizontal transfer pulse from being fed from the drive unit to the solid-state image sensing device during a period during which the transfer operation included in the series of photographing operations is not performed.

In the above specific configuration, a transfer operation included in the previous or next series of photographing operations is not performed within a period of the current series of photographing operations during which the transfer operation included therein is not performed, so that, during this period, the vertical transfer pulse and/or horizontal transfer pulse is stopped from being fed from the drive unit to the solid-state image sensing device. As described, the vertical transfer pulse and/or horizontal transfer pulse is stopped from being fed during a period during which the transfer operation included in the series of photographing operations is not performed. This provides a smaller number of outputs of the vertical transfer pulse and/or horizontal transfer pulse than that of conventional digital still cameras where the vertical transfer pulse and/or horizontal transfer pulse is fed throughout the whole period during which the series of photographing operations are repeated, resulting in further reduction in power consumption.

A second imaging device of the present invention includes a solid-state image sensing device; a drive unit for driving the solid-state image sensing device; and a control unit for controlling an operation of the drive unit, the solid-state image sensing device including an imaging area including a plurality of pixels arranged in the form of a matrix; a plurality of vertical registers for vertically transferring electric charges in a plurality of arrays of vertically arranged pixels in response to a vertical transfer pulse fed from the drive unit; and a horizontal register for outputting the electric charges transferred by the plurality of vertical registers in response to a horizontal transfer pulse fed from the drive unit, the drive unit including a pulse feeding circuit for feeding the vertical transfer pulse and horizontal transfer pulse to the solid-state image sensing device. The imaging device repeats a series of photographing operations in a cycle same as or longer than a period during which the series of photographing operations are performed, the series of photographing operations including a transfer operation for feeding the vertical transfer pulse and horizontal transfer pulse to the solid-state image sensing device and transferring the electric charges in the plurality of arrays of vertically arranged pixels to the horizontal register for output to the outside from the horizontal register, and the control unit includes a transfer pulse stop controller for stopping the vertical transfer pulse and/or horizontal transfer pulse from being fed from the drive unit to the solid-state image sensing device during a period during which the transfer operation included in the series of photographing operations is not performed.

The above second imaging device of the present invention repeats a series of photographing operations including a transfer operation in a cycle same as or longer than a period during which the series of photographing operations are performed. Therefore, a transfer operation included in the previous or next series of photographing operations is not performed within a period of the current series of photographing operations during which the transfer operation included therein is not performed, so that, during this period, the vertical transfer pulse and/or horizontal transfer pulse is stopped from being fed from the drive unit to the solid-state image sensing device. As described, the vertical transfer pulse and/or horizontal transfer pulse is stopped from being fed during a period during which the transfer operation included in the series of photographing operations is not performed. This provides a smaller number of outputs of the subpulse than that of conventional digital still cameras where the vertical transfer pulse and/or horizontal transfer pulse is fed throughout the whole period during which the series of photographing operations are repeated, resulting in reduction in power consumption.

As described above, the first and second imaging devices of the present invention can reduce the power consumption to less than that of conventional ones.

DETAILED DESCRIPTION OF EMBODIMENTS

The present invention embodied in a digital still camera including a solid-state image sensing device including a CCD will be specifically described below based on three embodiments. The following "subpulse" and "sub-timing pulse" may also be called "electronic shutter pulse".

First Embodiment

Figure 2:
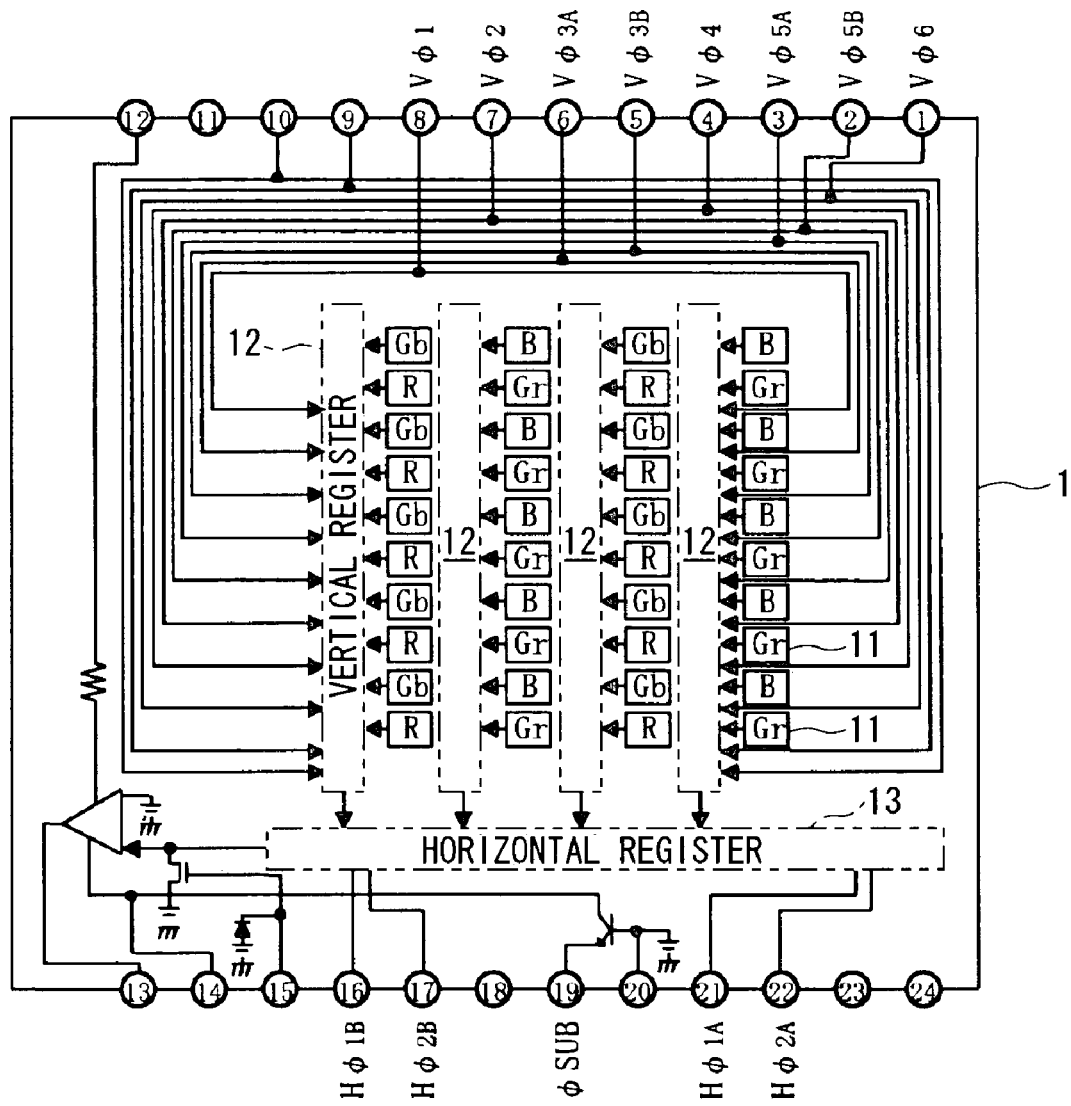
FIG. 2 is a block diagram showing a configuration of a solid-state image sensing device.

A digital still camera of the present invention includes a solid-state image sensing device 1 shown in FIG. 2. The solid-state image sensing device 1 has an input terminal 8 for a first vertical transfer pulse Vφ1 having a first phase, an input terminal 7 for a second vertical transfer pulse Vφ2 having a second phase, input terminals 6, 5 for a pair of third vertical transfer pulses Vφ3A and Vφ3B having a third phase, an input terminal 4 for a fourth vertical transfer pulse Vφ4 having a fourth phase, input terminals 3, 2 for a pair of fifth vertical transfer pulses Vφ5A and Vφ5B having a fifth phase, and an input terminal 1 for a sixth vertical transfer pulse Vφ6 having a sixth phase.

The solid-state image sensing device 1 also has input terminals 21, 16 for a pair of first horizontal transfer pulses Hφ1A and Hφ1B, and input terminals 22, 17 for a pair of second horizontal transfer pulses Hφ2A and Hφ2B provided by inverting the first horizontal transfer pulses. The solid-state image sensing device 1 is further provided with an input terminal 19 for a subpulse φSUB for causing an electronic shutter operation.

Figure 1:
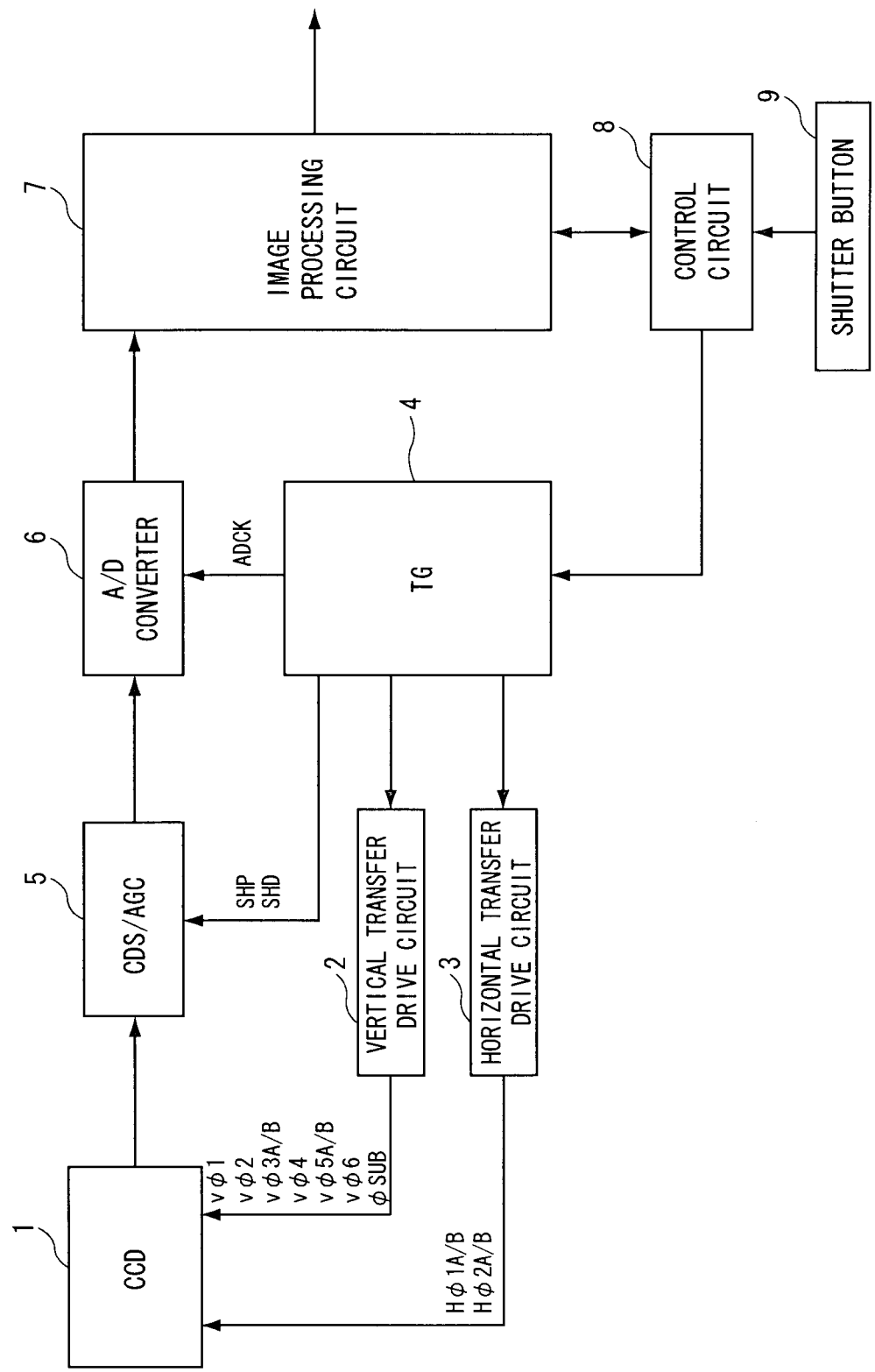
FIG. 1 is a block diagram showing a configuration of a digital still camera embodying the present invention.

FIG. 1 shows a configuration of the digital still camera of the present invention. The above solid-state image sensing device 1 has a vertical transfer drive circuit 2 and a horizontal transfer drive circuit 3 connected thereto, and has the above first vertical transfer pulse Vφ1, second vertical transfer pulse Vφ2, pair of third vertical transfer pulses Vφ3A, Vφ3B, fourth vertical transfer pulse Vφ4, pair of fifth vertical transfer pulses Vφ5A, Vφ5B, sixth vertical transfer pulse Vφ6 and subpulse φSUB fed from the vertical transfer drive circuit 2, and the pair of first horizontal transfer pulses Hφ1A, Hφ1B, and pair of second horizontal transfer pulses Hφ2A, Hφ2B fed from the horizontal transfer drive circuit 3.

A timing generator (TG) 4 is connected to the vertical transfer drive circuit 2 and horizontal transfer drive circuit 3. The timing generator 4 creates a first vertical timing pulse, a second vertical timing pulse, a pair of third vertical timing pulses, a fourth vertical timing pulse, a pair of fifth vertical timing pulses, a sixth vertical timing pulse, charge read pulses and a sub-timing pulse, and feeds these pulses to the vertical transfer drive circuit 2. The timing generator 4 also creates a pair of first horizontal timing pulses and a pair of second horizontal timing pulses, and feeds these pulses to the horizontal transfer drive circuit 3.

The vertical transfer drive circuit 2 creates the first to sixth vertical transfer pulses Vφ1, Vφ2, Vφ3A, Vφ3B, Vφ4, Vφ5A, Vφ5B and Vφ6 from the charge read pulses and first to sixth vertical timing pulses provided from the timing generator 4, and creates the subpulse φSUB by amplifying the sub-timing pulse. The created pulses are fed to the solid-state image sensing device 1. On the other hand, the horizontal transfer drive circuit 3 creates the pair of first horizontal transfer pulses Hφ1A, Hφ1B and pair of second horizontal transfer pulses Hφ2A, Hφ2B by amplifying the pair of first horizontal timing pulses and pair of second horizontal timing pulses provided from the timing generator 4, and feeds these pulses to the solid-state image sensing device 1.

A CCD output provided from the solid-state image sensing device 1 is output through a CDS/AGC circuit 5 including a sampling part CDS and a gain control part AGC, an A/D converter 6, and an image processing circuit for performing a predetermined image processing such as compression, to a subsequent circuit. The timing generator 4 feeds sampling signals SHP, SHD for sampling the CCD output to the CDS/AGC circuit 5. The timing generator 4 feeds a sampling signal ADCK for A/D conversion to the A/D converter 6.

A control circuit 8 is connected to the timing generator 4 and the image processing circuit 7. A shutter button 9 is connected to the control circuit 8. The control circuit 8 controls the timing generator 4 to output the vertical timing pulses to the vertical transfer drive circuit 2, and to output the horizontal timing pulses to the horizontal transfer drive circuit 3.

The control circuit 8 obtains an image signal (a luminance signal) for an active area of the solid-state image sensing device 1 from the image processing circuit 7 to detect a signal level of the image signal, and calculates an exposure time and a focus adjustment value based on the detection result. In accordance with the calculation result, the control circuit 8 controls the timing generator 4 to output the sub-timing pulse to the vertical transfer drive circuit 2, and controls an operation of a lens drive circuit, which is not shown.

Figure 3:
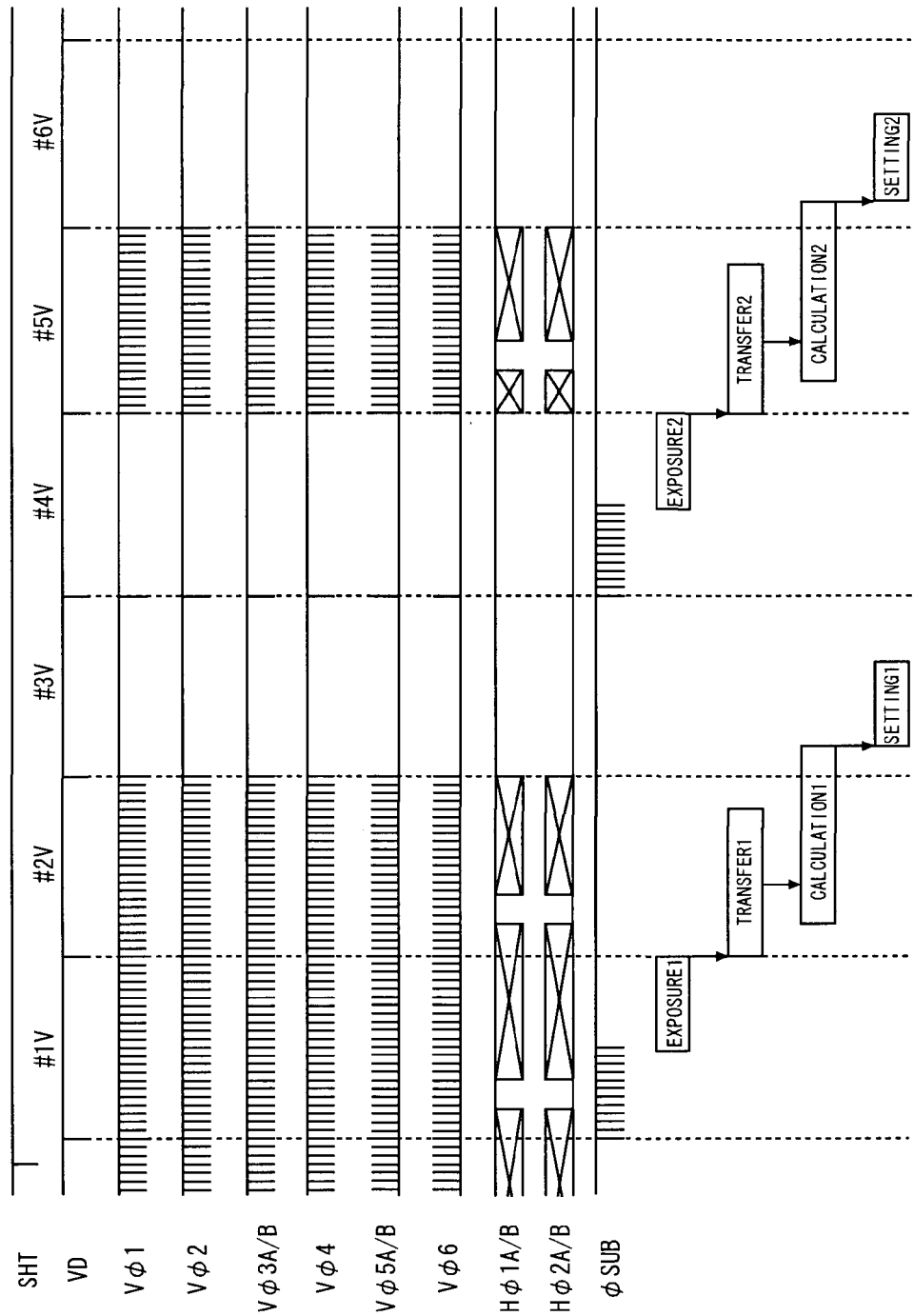
FIG. 3 is a timing chart showing operations of a digital still camera of a first embodiment at a time when a shutter button is depressed, and vertical transfer pulses, horizontal transfer pulses and a subpulse to be fed to the solid-state image sensing device.
Figure 8:
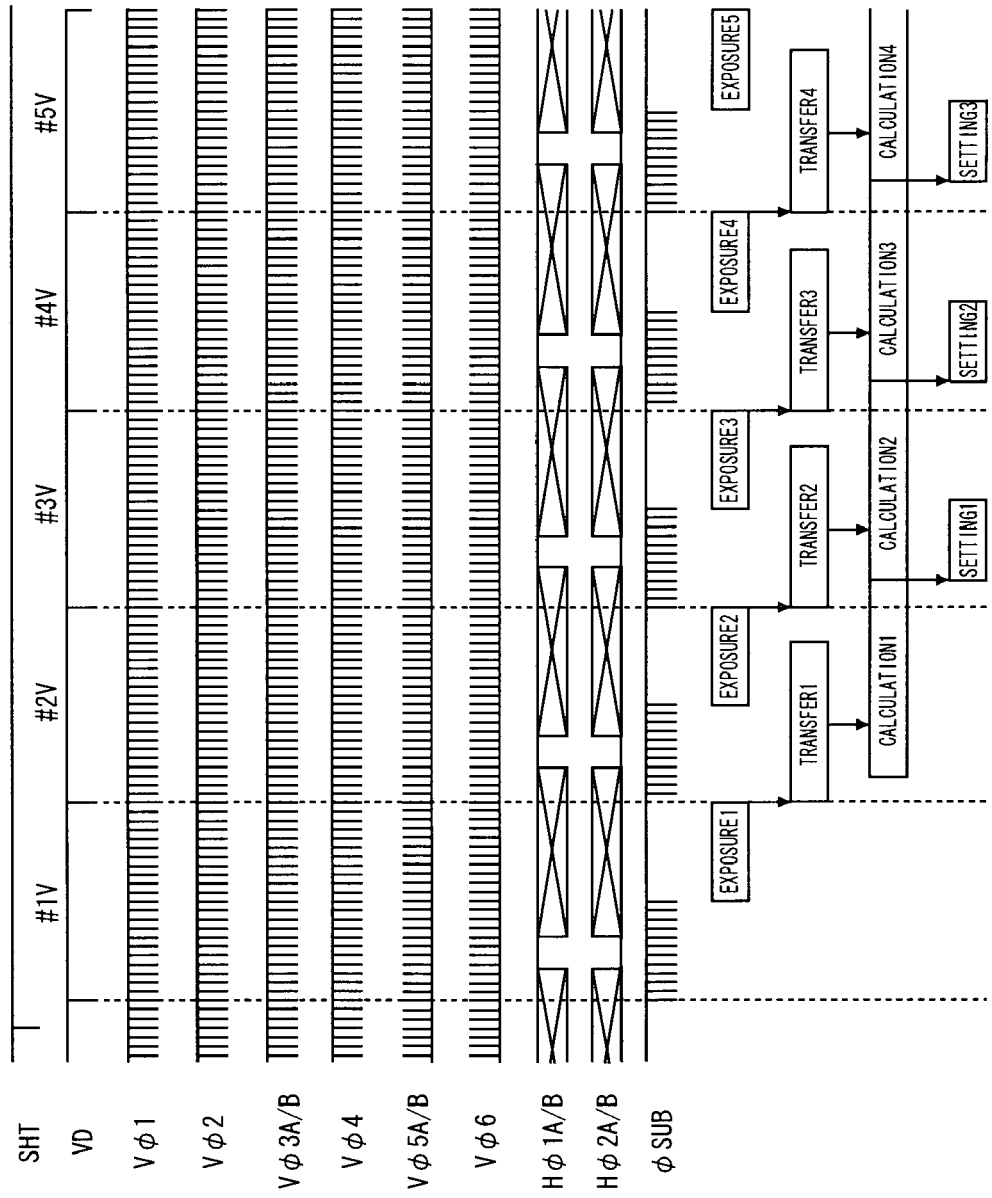
FIG. 8 is a timing chart showing operations of a conventional digital still camera at a time when a shutter button is depressed, and vertical transfer pulses, horizontal transfer pulses and a subpulse to be fed to the solid-state image sensing device.

The digital still camera of the present embodiment can set a monitor mode as conventionally. FIG. 3 shows operations of the digital still camera of the present embodiment at a time when the shutter button 9 is depressed with the monitor mode being set, and the vertical transfer pulses Vφ-Vφ6, horizontal transfer pulses Hφ1A, Hφ1B, Hφ2A, Hφ2B, and subpulse φSUB to be fed to the solid-state image sensing device 1. SHT in FIG. 3 is a shutter pulse generated upon depression of the shutter button 9, and VD is a vertical synchronizing pulse. The vertical transfer pulses, horizontal transfer pulses and subpulse are a rectangular pulse. One block of the horizontal transfer pulses in FIG. 8 represents a series of horizontal transfer pulses.

When the shutter button 9 is depressed, in a first vertical period (#1V), a series of subpulses φSUB are fed to the solid-state image sensing device to sweep out electric charges accumulated in the pixels, and thereafter the imaging area is exposed. Subsequently in a second vertical period (#2V), the first vertical transfer pulse Vφ1, second vertical transfer pulse Vφ2, third vertical transfer pulses Vφ3A, Vφ3B, fourth vertical transfer pulse Vφ4, fifth vertical transfer pulses Vφ5A, Vφ5B and sixth vertical transfer pulse Vφ6 are fed to the vertical registers, and the first horizontal transfer pulses Hφ1A, Hφ1B, and second horizontal transfer pulses Hφ2A, Hφ2B are fed to the horizontal register. Electric charges accumulated in the pixels due to the exposure are transferred, and then, based on an image signal thereby obtained, a calculation for an exposure time and a focus adjustment value is started. At this time, the subpulse φSUB is stopped from being fed to the solid-state image sensing device 1.

Next in a third vertical period (#3V), the calculation is continued, and thereafter the exposure time and focus adjustment value obtained by the calculation are set. At this time, the vertical transfer pulses Vφ1-Vφ6, horizontal transfer pulses Hφ1A, Hφ1B, Hφ2A, Hφ2B and subpulse φSUB are stopped from being fed to the solid-state image sensing device 1.

Subsequently in a fourth vertical period (#4V), a series of subpulses φSUB are fed to the solid-state image sensing device 1 to sweep out electric charges accumulated in the pixels, and thereafter the imaging area is exposed. At this time, the exposure time and focus adjustment value set as described above will be reflected. The vertical transfer pulses Vφ1-Vφ6 and horizontal transfer pulses Hφ1A, Hφ1B, Hφ2A, Hφ2B are stopped from being fed to the solid-state image sensing device 1. Next in a fifth vertical period (#5V), the vertical transfer pulses Vφ1-Vφ6 and horizontal transfer pulses Hφ1A, Hφ1B, Hφ2A, Hφ2B are fed to the solid-state image sensing device 1. Electric charges accumulated in the pixels due to the exposure are transferred, and then, based on an image signal thereby obtained, a calculation for an exposure time and a focus adjustment value is started. At this time, the subpulse φSUB is stopped from being fed to the solid-state image sensing device 1.

Next in a sixth vertical period (#6V), the calculation is continued, and thereafter the exposure time and focus adjustment value obtained by the calculation are set. At this time, the vertical transfer pulses Vφ1-Vφ6, horizontal transfer pulses Hφ1A, Hφ1B, Hφ2A, Hφ2B and subpulse φSUB are stopped from being fed to the solid-state image sensing device 1. The following exposure, transfer, calculation and setting are repeated in the same manner as during the fourth vertical period through sixth vertical period.

When the shutter button 9 is depressed, the digital still camera of the present embodiment repeats a series of photographing operations of an exposure, a transfer, calculation and setting in a cycle of three vertical periods, which is the same as a period during which the series of photographing operations are performed, and starts a photographing operation for image recording at a time point when an optimum exposure time and focus adjustment value are obtained. In a period during which the series of photographing operations are thus repeated, the subpulse φSUB is stopped from being fed to the solid-state image sensing device 1 during a period during which no exposure operation is performed, and the vertical transfer pulses Vφ1-Vφ6 and horizontal transfer pulses Hφ1A, Hφ1B, Hφ2A, Hφ2B are stopped from being fed to the solid-state image sensing device 1 during a period during which no transfer operation is performed.

Figure 4:
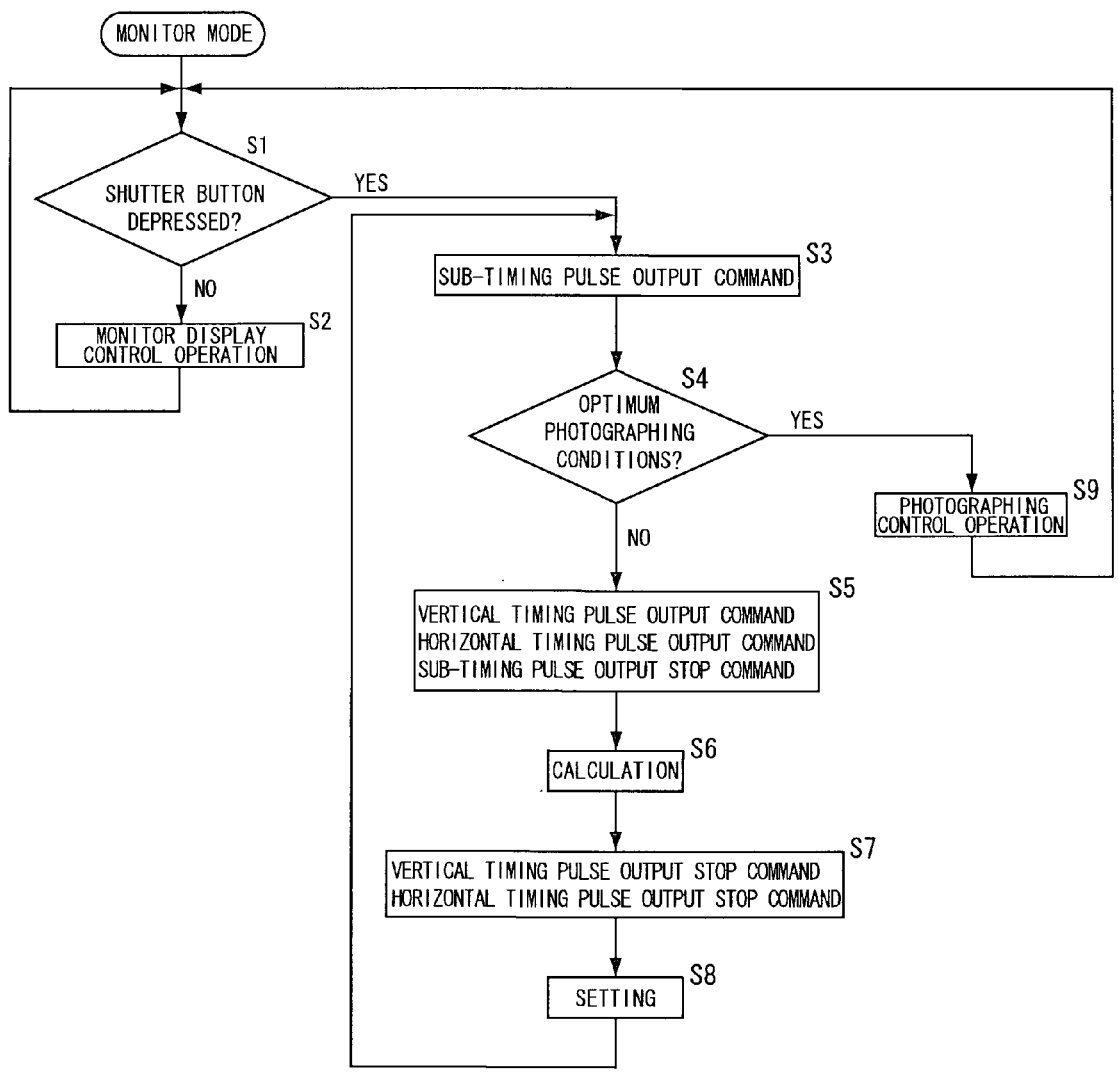
FIG. 4 is a flow chart showing operations of a monitor mode in the first embodiment.

FIG. 4 shows a procedure to be performed by the above control circuit 8 when the monitor mode is set. First step S1 determines whether the shutter button 9 is depressed or not. If the answer is negative, step S2 performs a normal monitor display control operation, followed by again step S1. Repetition of this processing of step S2 causes images photographed by the solid-state image sensing device 1 to be displayed on a monitor every 1/30 seconds, for example.

In contrast, if the shutter button 9 is depressed and the answer in step S1 is affirmative, step S3 follows to command the timing generator 4 to output a sub-timing pulse. In response to the command, the timing generator 4 outputs a sub-timing pulse to the vertical transfer drive circuit 2 during a period excluding a calculated exposure time in one vertical period. Accordingly, the vertical transfer drive circuit 2 feeds a subpulse to the solid-state image sensing device 1. This causes electric charges accumulated in the pixels to be swept out, and thereafter the imaging area is exposed for the exposure time.

Next step S4 determines based on an image signal whether or not optimum photographing conditions such as an exposure time and a focus adjustment value are set at this time. If the answer is negative, step S5 follows to command the timing generator 4 to output a vertical timing pulse and horizontal timing pulse, and to stop outputting the sub-timing pulse. In response to the output command, the timing generator 4 outputs a vertical timing pulse to the vertical transfer drive circuit 2, and also outputs a horizontal timing pulse to the horizontal transfer drive circuit 3. Accordingly, the vertical transfer drive circuit 2 feeds a vertical transfer pulse to the solid-state image sensing device 1, while the horizontal transfer drive circuit 3 feeds a horizontal transfer pulse to the solid-state image sensing device 1. This causes electric charges accumulated in the pixels due to the exposure to be transferred through the vertical registers 12 to the horizontal register 13, and output outside. In response to the output stop command, the timing generator 4 stops outputting the sub-timing pulse to the vertical transfer drive circuit 2 to thereby stop feeding the subpulse to the solid-state image sensing device 1.

Subsequently step S6 starts a calculation for an exposure time and a focus adjustment value. Thereafter, step S7 commands the timing generator 4 to stop outputting the vertical timing pulse and horizontal timing pulse. In response to the command, the timing generator 4 stops outputting the vertical timing pulse to the vertical transfer drive circuit 2, and outputting the horizontal timing pulse to the horizontal transfer drive circuit 3, to thereby stop feeding the vertical transfer pulse and horizontal transfer pulse to the solid-state image sensing device 1. Next step S8 sets the exposure time and focus adjustment value provided by the calculation after the calculation is finished. Thereafter, step S3 follows again. The above processing of step S3, step S5 and step S7 is sequentially performed each time one vertical period elapses. As shown in FIG. 3, a series of photographing operations including an exposure, a transfer, calculation and setting are repeated every three vertical periods by repetition of the processing of step S3 through step S8.

Thereafter, when step S4 in FIG. 4 determines that optimum photographing conditions such as an exposure time and a focus adjustment value are set, step S9 follows to perform a photographing control operation for image recording. Thereafter, step S1 follows again. Images photographed by the solid-state image sensing device 1 will be thus recorded on a recording medium.

As shown in FIG. 3, the digital still camera of the present embodiment has a calculation time for an exposure time and a focus adjustment value exceeding one vertical period, and, in a period during which the series of photographing operations are repeated, stops feeding the subpulse φSUB to the solid-state image sensing device 1 during a period during which no exposure operation is performed, while stopping feeding the vertical transfer pulses Vφ1-Vφ6 and horizontal transfer pulses Hφ1A, Hφ1B, Hφ2A, Hφ2B to the solid-state image sensing device 1 during a period during which no transfer operation is performed, and therefore reduces the power consumption to less than that of conventional digital still cameras where, as shown in FIG. 8, the subpulse φSUB, vertical transfer pulses Vφ1-Vφ6 and horizontal transfer pulses Hφ1A, Hφ1B, Hφ2A, Hφ2B are fed to the solid-state image sensing device throughout the whole period.

When a view finder is used and images photographed by the solid-state image sensing device 1 are not displayed on the monitor, the above series of photographing operations are repeated every three vertical periods like when the shutter button 9 is depressed. The subpulse is stopped from being fed during a period during which no exposure operation is performed, while the vertical transfer pulses and horizontal transfer pulses are stopped from being fed during a period during which no transfer operation is performed.

Second Embodiment

Whereas the digital still camera of the first embodiment has a calculation time for an exposure time and a focus adjustment value exceeding one vertical period as shown in FIG. 3, a digital still camera of the present embodiment has a calculation time less than one vertical period.

Figure 5:
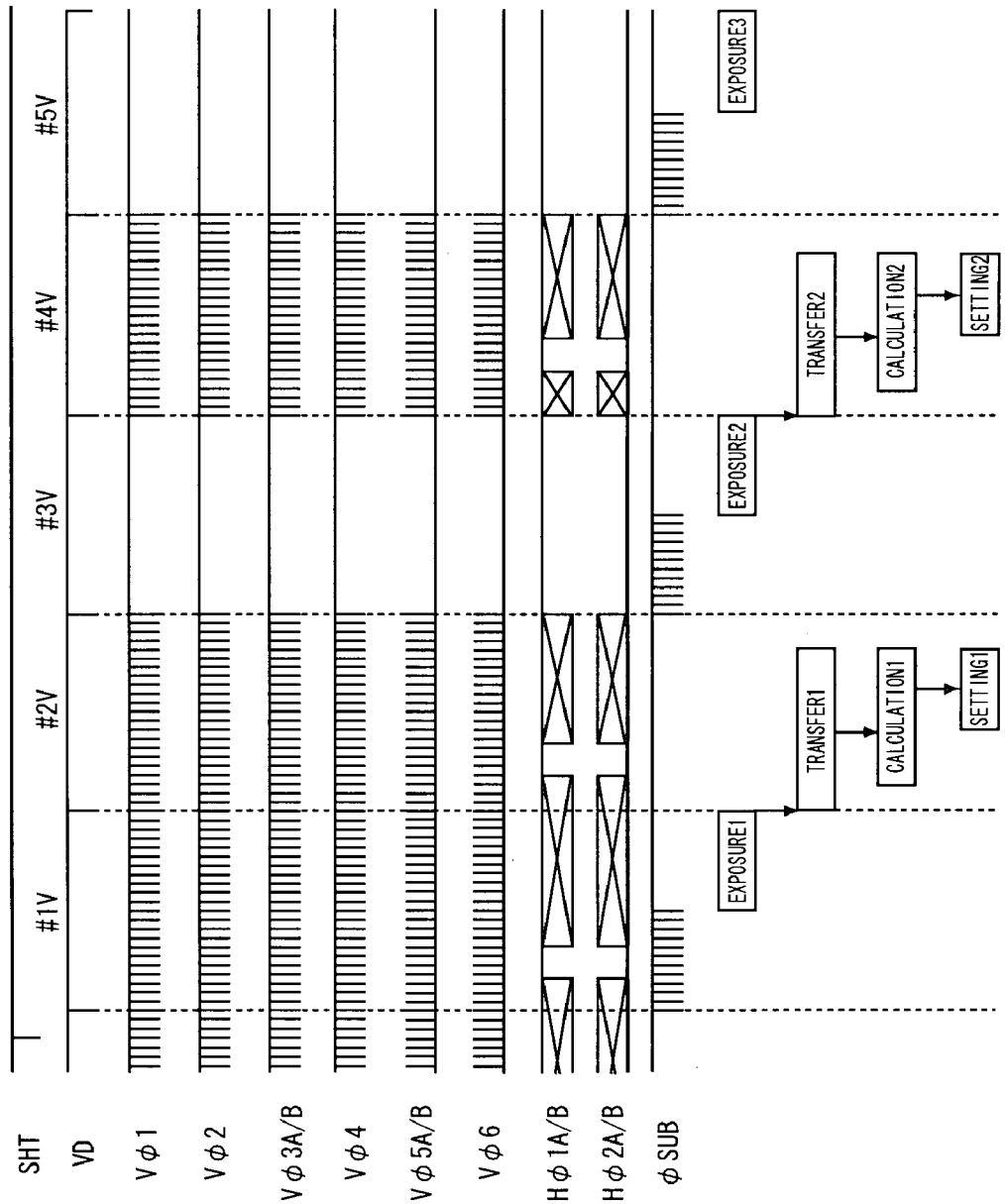
FIG. 5 is a timing chart showing operations of a digital still camera of a second embodiment at a time when a shutter button is depressed, and vertical transfer pulses, horizontal transfer pulses and a subpulse to be fed to the solid-state image sensing device.

FIG. 5 shows operations of the digital still camera of the present embodiment at a time when a shutter button is depressed, and the vertical transfer pulses Vφ1-Vφ6, horizontal transfer pulses Hφ1A, Hφ1B, Hφ2A, Hφ2B, and subpulse φSUB to be fed to the solid-state image sensing device 1. SHT in FIG. 5 is a shutter pulse generated upon depression of the shutter button, and VD is a vertical synchronizing pulse. The vertical transfer pulses, horizontal transfer pulses and subpulse are a rectangular pulse. One block of the horizontal transfer pulses in FIG. 5 represents a series of horizontal transfer pulses.

When the shutter button is depressed, in a first vertical period (#1V), a series of subpulses φSUB are fed to the solid-state image sensing device to sweep out electric charges accumulated in the pixels, and thereafter the imaging area is exposed. Subsequently in a second vertical period (#2V), the first vertical transfer pulse Vφ1, second vertical transfer pulse Vφ2, third vertical transfer pulses Vφ3A, Vφ3B, fourth vertical transfer pulse Vφ4, fifth vertical transfer pulses Vφ5A, Vφ5B and sixth vertical transfer pulse Vφ6 are fed to the vertical registers, and the first horizontal transfer pulses Hφ1A, Hφ1B, and second horizontal transfer pulses Hφ2A, Hφ2B are fed to the horizontal register. Then electric charges accumulated in the pixels due to the exposure are transferred. Based on an image signal thereby obtained, a calculation for an exposure time and a focus adjustment value is performed, so that the exposure time and focus adjustment value obtained by the calculation are set.

Subsequently in a third vertical period (#3V), a series of subpulses φSUB are fed to the solid-state image sensing device 1 to sweep out electric charges accumulated in the pixels, and thereafter the imaging area is exposed. At this time, the exposure time and focus adjustment value set as described above will be reflected. The vertical transfer pulses Vφ1-Vφ6 and horizontal transfer pulses Hφ1A, Hφ1B, Hφ2A, Hφ2B are stopped from being fed to the solid-state image sensing device 1. Next in a fourth vertical period (#4V), the vertical transfer pulses Vφ1-Vφ6 and horizontal transfer pulses Hφ1A, Hφ1B, Hφ2A, Hφ2B are fed to the solid-state image sensing device 1. Then electric charges accumulated in the pixels due to the exposure are transferred. Based on an image signal thereby obtained, a calculation for an exposure time and a focus adjustment value is performed, so that the exposure time and focus adjustment value obtained by the calculation are set. The following exposure, transfer, calculation and setting are repeated in the same manner as during the third vertical period and fourth vertical period.

Figure 9:
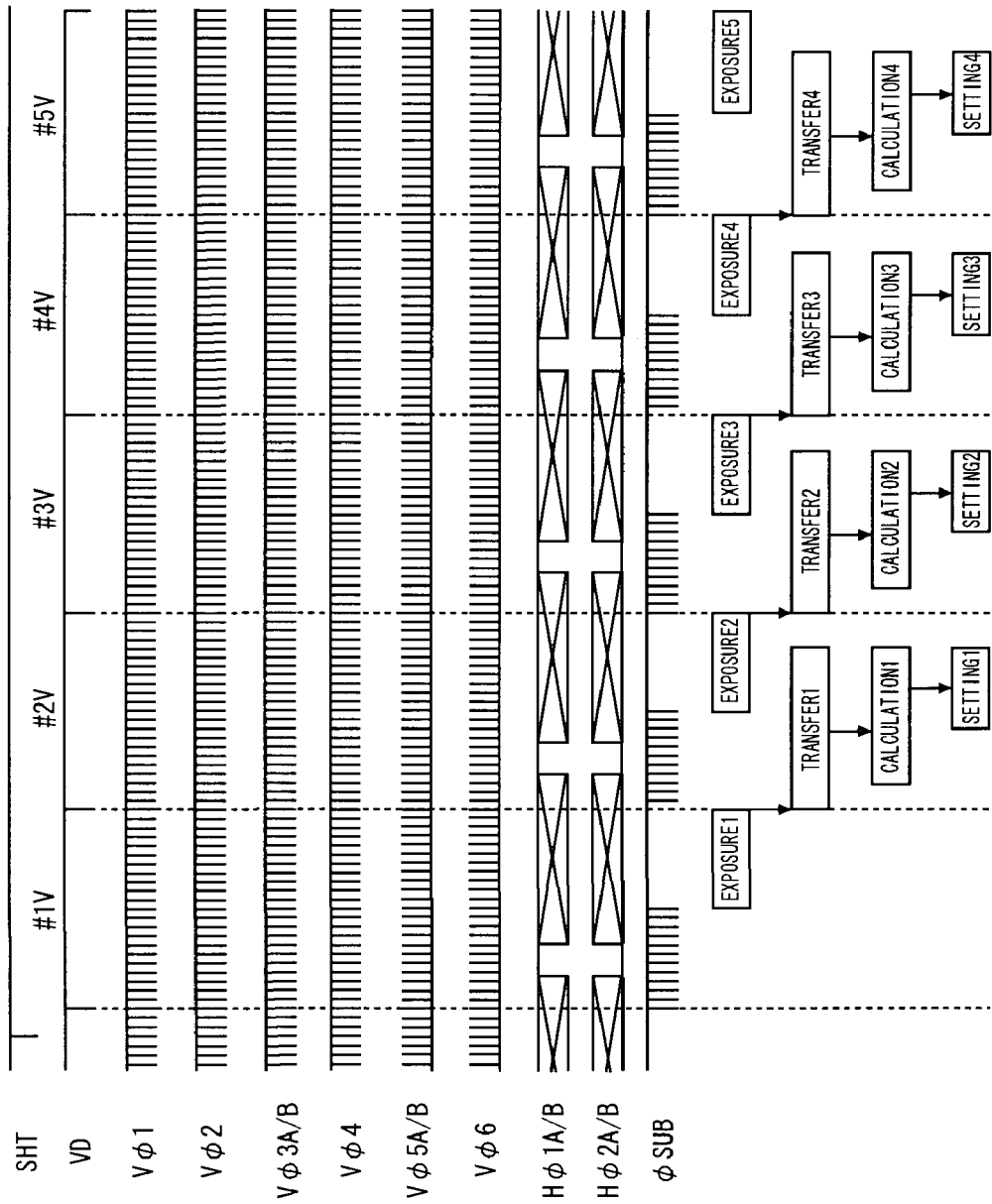
FIG. 9 is a timing chart showing operations of another conventional digital still camera at a time when a shutter button is depressed, and vertical transfer pulses, horizontal transfer pulses and a subpulse to be fed to the solid-state image sensing device.

When the shutter button 9 is depressed, the digital still camera of the present embodiment repeats a series of photographing operations of an exposure, a transfer, calculation and setting in a cycle of two vertical periods, which is the same as a period during which the series of photographing operations are performed, and starts a photographing operation for image recording at a time point when an optimum exposure time and focus adjustment value are obtained. In a period during which the series of photographing operations are thus repeated, the subpulse φSUB is stopped from being fed to the solid-state image sensing device 1 during a period during which no exposure operation is performed, and the vertical transfer pulses Vφ1-Vφ6 and horizontal transfer pulses Hφ1A, Hφ1B, Hφ2A, Hφ2B are stopped from being fed to the solid-state image sensing device 1 during a period during which no transfer operation is performed. Therefore, the power consumption is reduced to less than that of conventional digital still cameras where, as shown in FIG. 9, the subpulse φSUB, vertical transfer pulses Vφ1-Vφ6 and horizontal transfer pulses Hφ1A, Hφ1B, Hφ2A, Hφ2B are fed to the solid-state image sensing device throughout the whole period.

Third Embodiment

Figure 6:
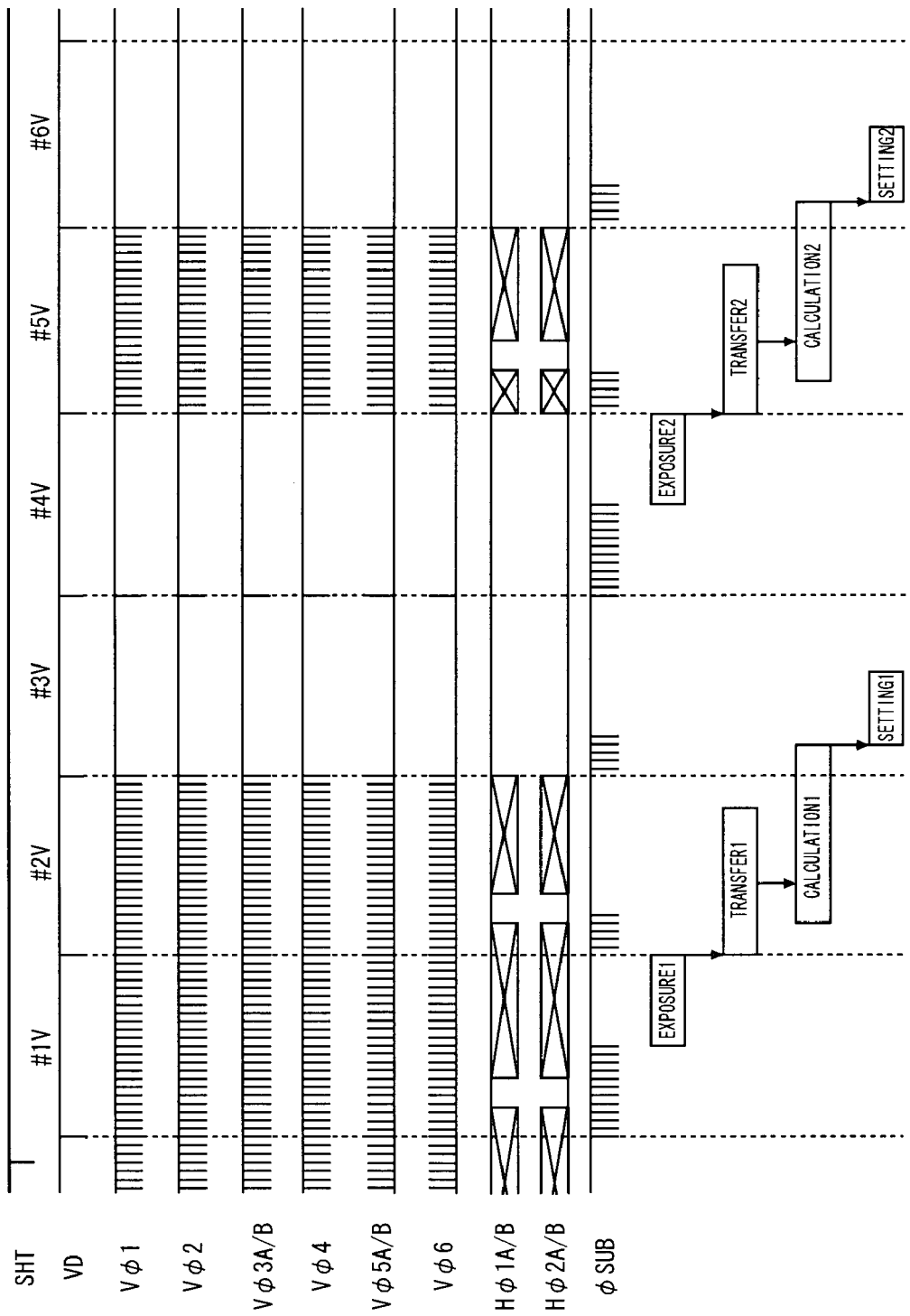
FIG. 6 is a timing chart showing operations of a digital still camera of a third embodiment at a time when a shutter button is depressed, and vertical transfer pulses, horizontal transfer pulses and a subpulse to be fed to the solid-state image sensing device.
Figure 7:
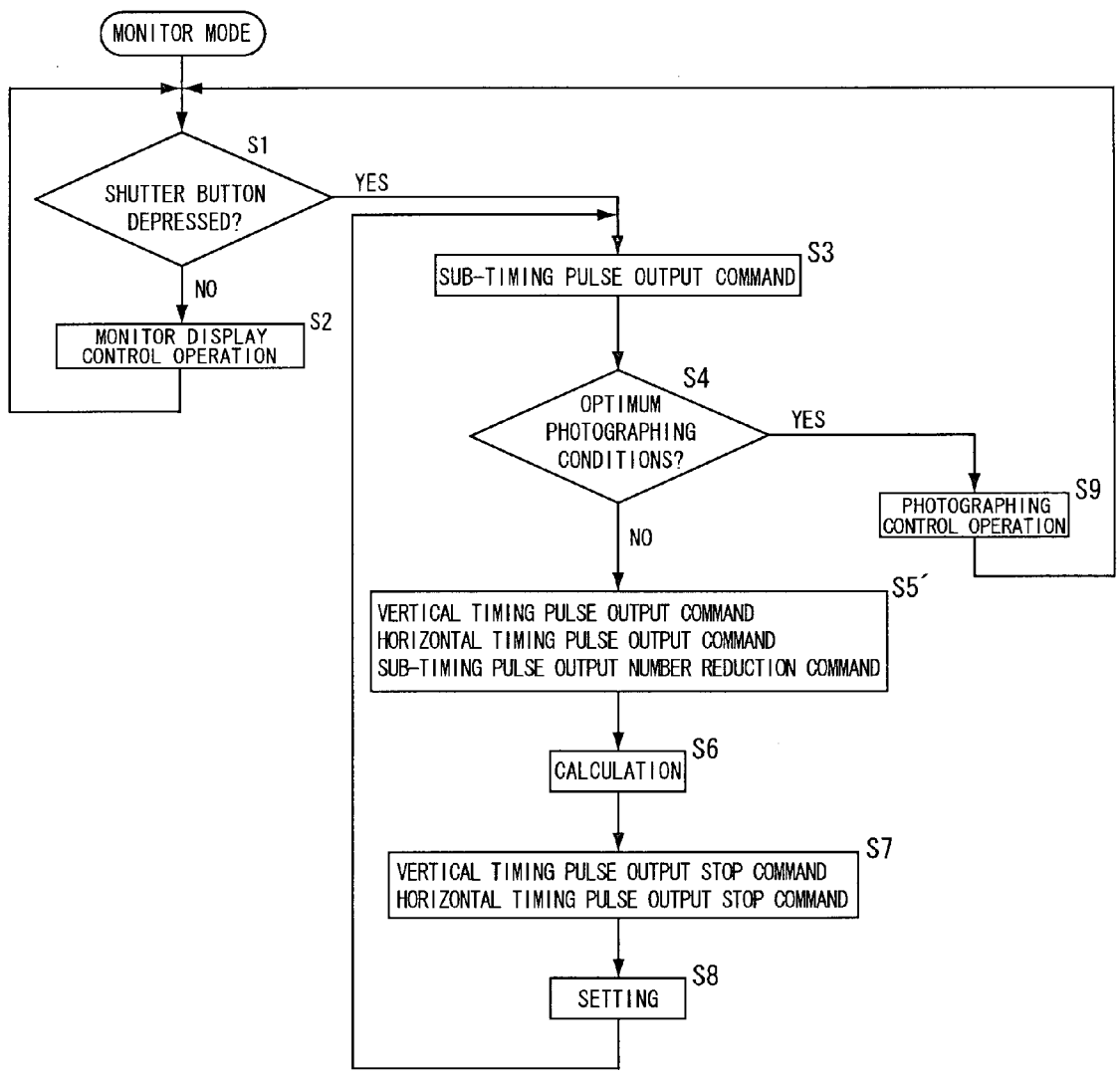
FIG. 7 is a flow chart showing operations of a monitor mode in the third embodiment.

As shown in FIG. 6, a digital still camera of a third embodiment employs an operation for reducing an output number of the subpulse φSUB, instead of an operation for stopping feeding the subpulse φSUB in the above first embodiment. Step S5' shown in FIG. 7 gives a sub-timing pulse output number reduction command. This would also reduce the power consumption to less than that of conventional digital still cameras.

The present invention is not limited to the foregoing embodiments in construction but can be modified variously by one skilled in the art without departing from the spirit of the invention as set forth in the appended claims. For example, the present invention may be embodied in a digital still camera including a three-phase drive system solid-state image sensing device or four-phase drive system solid-state image sensing device, although the above embodiments are digital still cameras including a six-phase drive system solid-state image sensing device 1 shown in FIG. 2.

What is claimed is:

1. An imaging device comprising a solid-state image sensing device comprising an imaging area comprising a plurality of pixels; a drive unit for driving the solid-state image sensing device; and a control unit for controlling an operation of the drive unit, the solid-state image sensing device being capable of sweeping out electric charges accumulated in the pixels in response to a subpulse fed from the drive unit, the drive unit comprising a pulse feeding circuit for feeding the subpulse to the solid-state image sensing device, wherein the imaging device repeats a series of photographing operations in a cycle same as or longer than a period during which the series of photographing operations are performed, the series of photographing operations including an exposure operation for exposing the imaging area after the subpulse is fed to the solid-state image sensing device to sweep out the electric charges accumulated in the pixels, and the control unit comprises a subpulse stop controller for stopping the subpulse from being fed from the drive unit to the solid-state image sensing device during a period during which the exposure operation included in the series of photographing operations is not performed.

2. The imaging device according to claim 1, wherein the solid-state image sensing device comprises a plurality of vertical registers for vertically transferring electric charges in a plurality of arrays of vertically arranged pixels in response to a vertical transfer pulse fed from the drive unit; and a horizontal register for outputting the electric charges transferred by the plurality of vertical registers in response to a horizontal transfer pulse fed from the drive unit, the pulse feeding circuit of the drive unit being capable of feeding the vertical transfer pulse and horizontal transfer pulse to the solid-state image sensing device, the series of photographing operations including a transfer operation for feeding the vertical transfer pulse and horizontal transfer pulse to the solid-state image sensing device and transferring the electric charges in the plurality of arrays of vertically arranged pixels to the horizontal register for output to the outside from the horizontal register, the control unit comprising a transfer pulse stop controller for stopping the vertical transfer pulse and/or horizontal transfer pulse from being fed from the drive unit to the solid-state image sensing device during a period during which the transfer operation included in the series of photographing operations is not performed.

3. The imaging device according to claim 1, further comprising a record processing circuit for recording an image photographed by the solid-state image sensing device on a recording medium, wherein the series of photographing operations are repeated when a user performs an image recording manipulation.

4. An imaging device comprising a solid-state image sensing device; a drive unit for driving the solid-state image sensing device; and a control unit for controlling an operation of the drive unit, the solid-state image sensing device comprising an imaging area comprising a plurality of pixels arranged in the form of a matrix; a plurality of vertical registers for vertically transferring electric charges in a plurality of arrays of vertically arranged pixels in response to a vertical transfer pulse fed from the drive unit; and a horizontal register for outputting the electric charges transferred by the plurality of vertical registers in response to a horizontal transfer pulse fed from the drive unit, the drive unit comprising a pulse feeding circuit for feeding the vertical transfer pulse and horizontal transfer pulse to the solid-state image sensing device, wherein the imaging device repeats a series of photographing operations in a cycle same as or longer than a period during which the series of photographing operations are performed, the series of photographing operations including a transfer operation for feeding the vertical transfer pulse and horizontal transfer pulse to the solid-state image sensing device and transferring the electric charges in the plurality of arrays of vertically arranged pixels to the horizontal register for output to the outside from the horizontal register, and the control unit comprises a transfer pulse stop controller for stopping the vertical transfer pulse and/or horizontal transfer pulse from being fed from the drive unit to the solid-state image sensing device during a period during which the transfer operation included in the series of photographing operations is not performed.

5. The imaging device according to claim 4, further comprising a record processing circuit for recording an image photographed by the solid-state image sensing device on a recording medium, wherein the series of photographing operations are repeated when a user performs an image recording manipulation.

* * * * *